United States Patent [19]

Befort

[11] Patent Number: 4,529,145
[45] Date of Patent: Jul. 16, 1985

[54] JOURNALLING STRUCTURE FOR SEAT BELT RETRACTORS

[75] Inventor: Horst U. Befort, Midland, Canada

[73] Assignee: TRW Inc., Cleveland, Ohio

[21] Appl. No.: 509,387

[22] Filed: Jun. 30, 1983

[30] Foreign Application Priority Data

Feb. 18, 1983 [CA] Canada .................................. 421933

[51] Int. Cl.³ ...................... A62B 35/02; B65H 75/48
[52] U.S. Cl. ............................................... 242/107.4 A
[58] Field of Search ......... 242/107, 107.4 R, 107.4 E; 308/2 R; 384/420, 243; 280/806-808; 297/475-480

[56] References Cited

U.S. PATENT DOCUMENTS

| 1,557,600 | 10/1925 | Mademann | 384/243 |
| 1,668,839 | 5/1928 | Cureton | 384/243 |
| 3,945,587 | 3/1976 | Willey et al. | 242/107.4 A |
| 3,958,773 | 5/1976 | Sugar | 242/107.4 R |
| 4,040,576 | 8/1977 | Walker et al. | 242/107.4 A |
| 4,129,267 | 12/1978 | Degras et al. | 242/107.4 A |
| 4,136,841 | 1/1979 | Fohl | 242/107 |
| 4,223,853 | 9/1980 | Ernst | 242/107.4 R |
| 4,328,934 | 5/1982 | Ahad | 242/107.4 A |
| 4,366,934 | 1/1983 | Seifert et al. | 242/107.4 A |
| 4,369,931 | 1/1983 | Fohl | 242/107 |

Primary Examiner—John M. Jillions
Attorney, Agent, or Firm—Yount & Tarolli

[57] ABSTRACT

A journalling structure for seat belt retractors and especially pawl bars thereof and comprising sockets in which raised arcuate portions are provided in thrust relation to the ends of stub shafts in minimization of friction under end thrust circumstances and where similar radial load bearing surfaces engage the flat surfaces of the stub shafts providing axial poising of the shafts and minimization of friction. The sockets are molded plastic and may be integrally formed in frame and saddle construction.

10 Claims, 9 Drawing Figures

JOURNALLING STRUCTURE FOR SEAT BELT RETRACTORS

The present invention is directed to a journal system for seat belt retractors and more particularly but not exclusively to saddle structures in seat belt retractors, which saddles are suspended on the axis of the drum shaft and wherein the pawl bar is pivotal on a resilient arm of the saddle in response to a tilting of an inertial element or sensor.

The problem of journalling the pawl bar becomes especially acute when the axis of the pivoting element such as the drum, spool or pawl bar is at an angle deviating from horizontal. In such instances the radial loading of the journal is distorted by axial forces and in prior art journalling the friction is considerable or erratic and unpredictable under load. This is especially true when it is desired to minimize the pendulum mass and where plural retractors are in a common frame responding to individual sensors at variant angles.

The closest prior art known to applicant is found in the saddles in the U.S. Pat. No. 4,040,576 to Ronald J. Walker, et al.; U.S. Pat. No. 3,945,587 to Ronald Albert Willey, et al.; and U.S. Pat. No. 4,129,267 to James C. Degras, et al. None of the known prior retractor art seems to be aware of the problem, let alone suggesting a solution. Awareness of the problem occurs when the shafting supporting pawls or retractor spools are canted at angles up to and exceeding 30° from horizontal.

Accordingly, the principal object of the present invention is to provide a molded relatively frictionless journal in reaction to axial and even radial thrust and most useful in retractor saddles and most particularly retractor saddles used in plural spool retractors using individual sensors and where the drum and pivot axes deviate from horizontal. It will be appreciated that the journal system expressed herein is applicable in molded sockets to single spool retractors also and to pawl bar suspension with and without saddles as are found in the seat belt harness art.

Another object is to achieve the principal object at minimum cost and preferably by providing a journal structure acting against a shaft axis when the shaft is usually non-cylindrical and wherein run-out end tolerances may vary considerably.

Other objects including the exploitation of a minimum contact concept in journalling will be appreciated as the description proceeds.

Any journalling system seeks to minimize friction at the bearing interfacing with the load. For this reason roller and ball bearing structures which reduce surface contact are regarded as desirable and indeed against precision cylindrical surfaces and flat thrust shoulders such journalling is very desirable. Lubricating inserts or sleeves in combination with ball or roller thrust bearings are well known journalling expedients. As one applies himself to the problem found in retractor shafting, however, the run-out ends of the shafting or stubs are rarely cylindrical and their lineal variances and dimensional tolerances are functions of the machining of stampings or crude cut-off and the like of the non-round shaft where rollers and balls and even sleeves are not satisfactory. By opening the sockets to ample end play and by utilizing butterfly tilting on the flats of the stub shafting, satisfactory performance has been obtained in pawls at moderate deviations from horizontal in circumstances where end thrust and radial loading were not critical. As the angle from horizontal increases, the end thrust load increases and radial stresses tend to wobble the poise of the journal to the shaft. The solution had to be simple and inexpensive and accordingly the present invention came about and is applicable in its preferred embodiment to the journalling of pawl bars in plastic saddle supporting sensor pendulums and where the spool or drum of the retractor is angled substantially from horizontal.

GENERAL DESCRIPTION

In general, the present invention is a journal structure especially useful in seat belt retractors and the like and particularly in the saddles thereof where the saddles journal and support the tilting pawl bar when the retractor is positioned at an angle deviating from horizontal. To achieve this a raised arcuate portion of the end barrier of the shaft socket is placed in contact with the end of the stub shaft. Then at thrust load, the plane end of the shaft against the point or line contact results in minimization of friction. Ideally, the shaft located by similar radial loading surfaces presents a point or minimum line contact at or adjacent the centerline of the shaft axis and within the working tolerances of stampings with rectangular stub shaft extensions. Since the saddles are molded, the bearing sockets of the saddles are easily modified to present the end barrier with the raised arcuate portion or welt and running transverse of the principal cross-sectional direction of the shaft. Similar shouldering may be molded into the shouldering surfaces of the socket so that the radial loading of the linear side shafts impinge on the line contacts. These radial journal elements are located in the molded sockets slightly askew to the axis of the raised arcuate thrust bearing portion or welt.

The structure functions well and allows tilting of retractors at mounting to about 80° from horizontal without serious defective performance. This substantially extends the design range of retractor structures and with happy economic consequences in the retractor art. The described construction permits elimination of many webbing guide features by positioning webbing flow from the retractors in a salutary manner.

IN THE DRAWINGS

FIG. 1 is a front elevation view of a pair of safety belt retractor spools in a common frame and each served by individual inertial sensor elements of the vehicle sensitive type wherein the sensors are depended vertically from saddles which include a pair of spaced-apart journals supporting the pivotal pawl bar. These saddles deviate from horizontal while suspending the inertial elements vertically.

SPECIFIC DESCRIPTION

Figure 1:
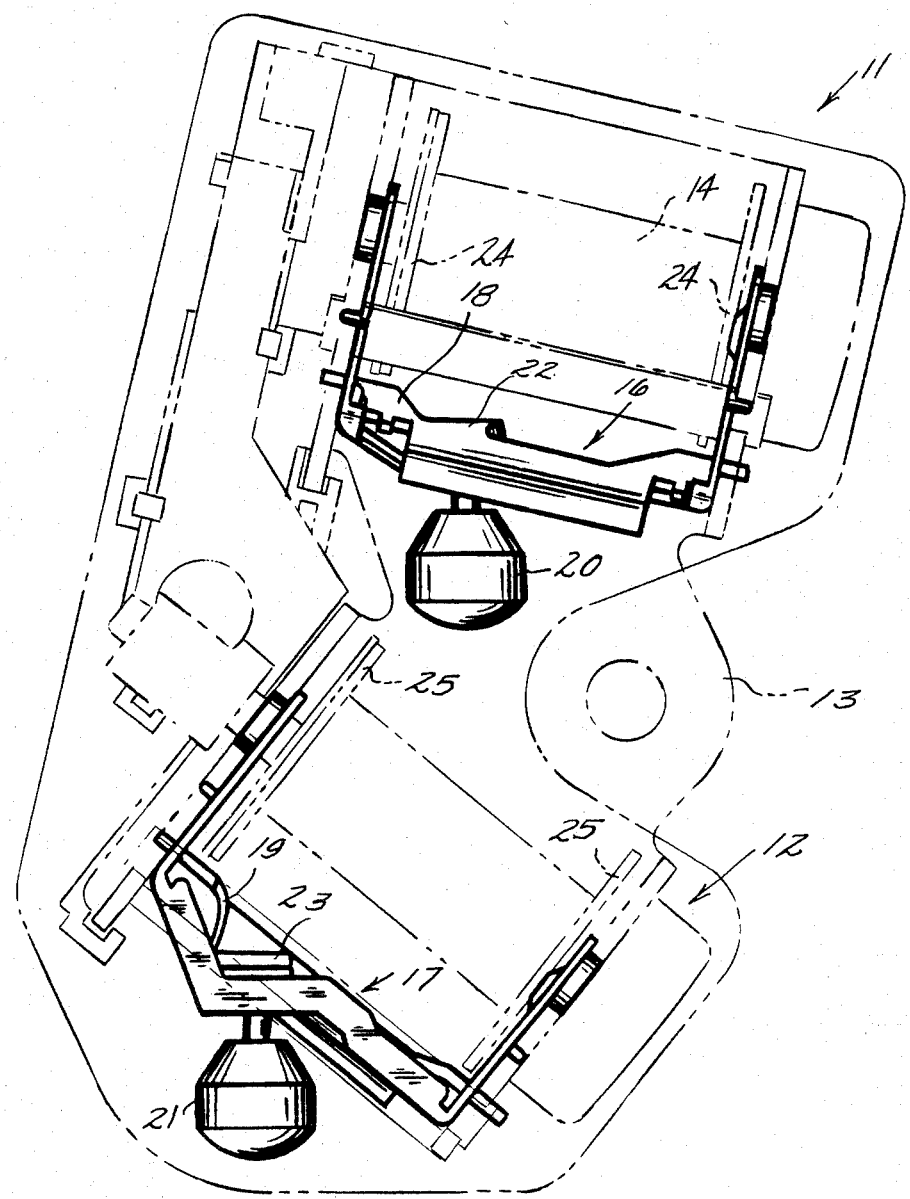

Referring to the drawings and with first specificity to the FIG. 1 thereof, a typical pair of retractors 11 and 12 serving, for example, two runs of webbing are mounted on a common frame or chassis 13. The retractors 11 and 12 and frame 13 are shown in phantom line but from the angle of the drums 14 and 15 to horizontal it is appreciated that sensor control saddles 16 and 17, respectively, must pivot the pawl bars 18 and 19 at angles equally as steep as the mounting angles of the drums 14 and 15. In both retractors 14 and 15 and in the respective saddles 16 and 17, the pendulums 20 and 21 must be poised for mounting in vertical directions as shown in FIG. 1 with their control surfaces 22 and 23 in a horizontal plane. Then as vehicle acceleration or deceleration exceeds a selected rate the pendulums 20 and 21 deviate from the relative positions shown and in tilting from their control surfaces 22 and 23, respectively, they tilt the pawl bars 18 and 19 locking against the ratchet teeth of the spool flanges 24 and 25 of the respective spools 14 and 15. Between the mounting tilt as illustrated in FIG. 1 and the deviation imposed by sudden acceleration and deceleration, the pivot axes of the pawl bars 17 and 18 are subjected to severe imbalances.

Figure 2:
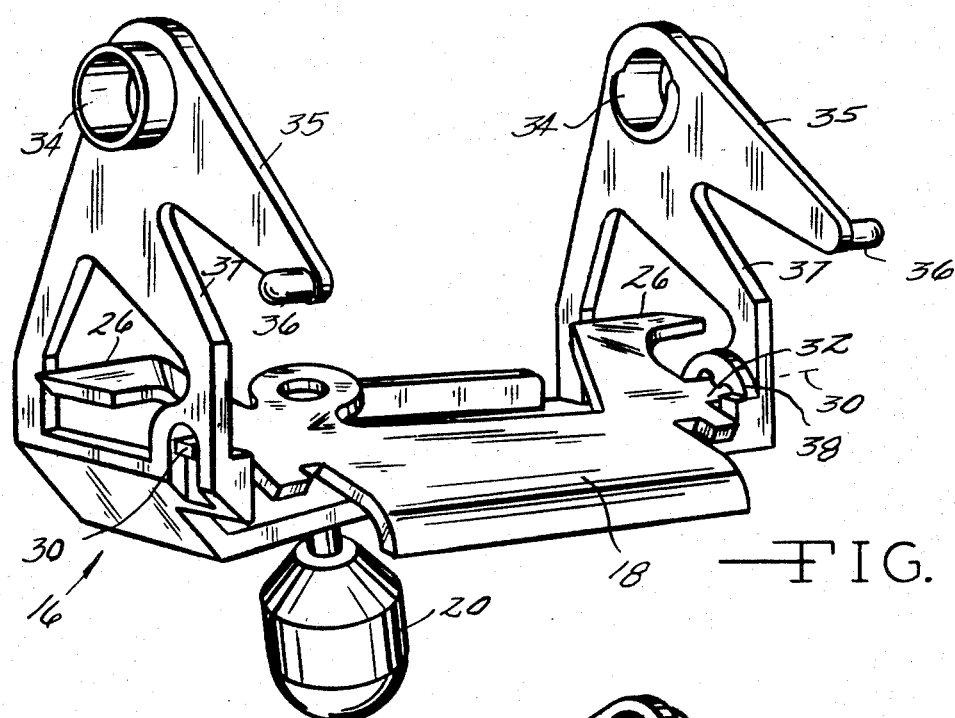
FIG. 2 is a perspective view of the uppermost saddle, sensor, and pawl bar seen in FIG. 1 and indicating the axial loading of the journal on the right side of the FIG. 2.
Figure 3:
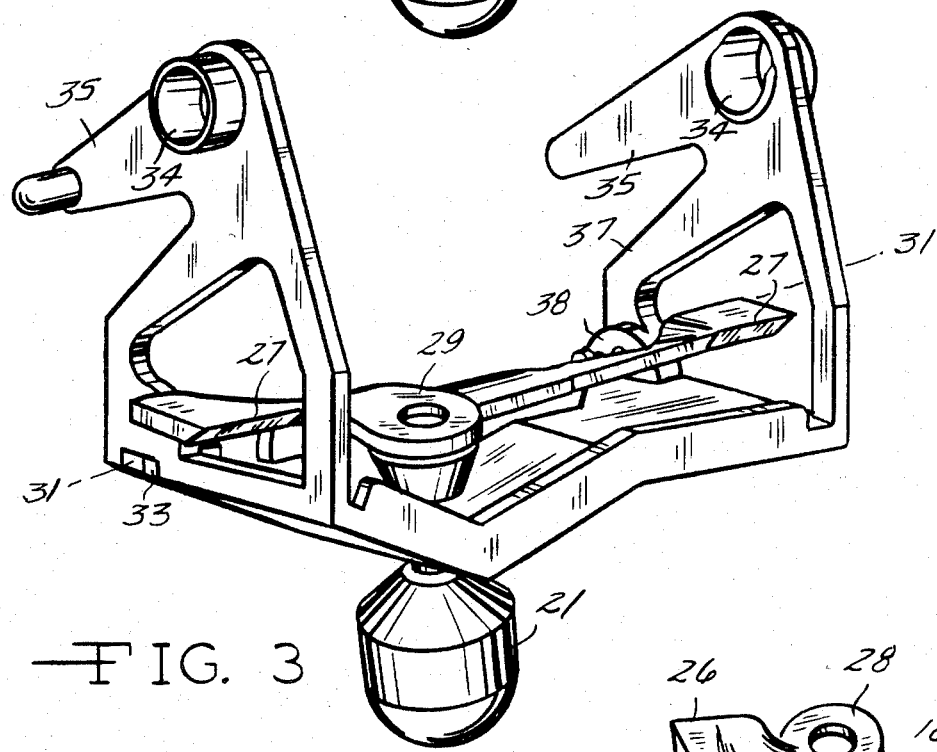
FIG. 3 is a perspective view of the lowermost saddle as seen in the FIG. 1 supporting the sensor and pawl bar and indicating the axial loading of the lowermost journal at the right side of the FIG. 3. Here the pawl bar is operationally reversed from the pawl bar in FIG. 2.

Referring to FIGS. 2 and 3, the saddles 16 and 17 are better visualized. In these figures, note that the pendulums are shown deviating in axis from the vertical to indicate the active condition of the sensors or pendulums which have tilted to raise the pawl teeth 26 and 27, respectively, in the saddles 16 and 17. The tilting caused by the raising of the pads 28 and 29, respectively, is a tilting on the respective axes 30—30 and 31—31 in respect to the rectangular cross sectioned stub shafts 32 and 33 in the stamped pawl bars 18 and 19, respectively.

Figure 4:
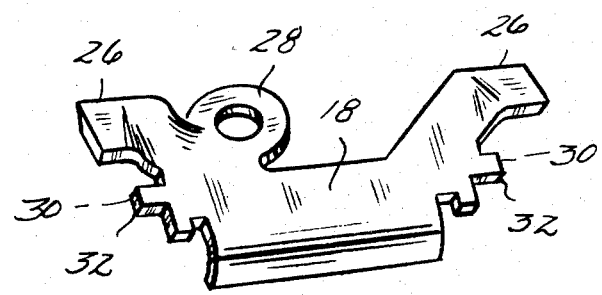
FIG. 4 is a perspective view of the pawl bar and indicating its pivot axis including rectangular cross section stub shafts and the thrust support shoulders as well as the ratchet contacting pawl surfaces.

By reference to the FIG. 4, the pawl bar 18 is removed easily from the saddle 16 by simple plastic deformation and the typical construction is visible in respect to the stub shafts. By reference again to FIG. 2, the saddle 16 will be appreciated as injection molded in a precision manner to serve the drum 14 at the sleeve bearings 34 at the apex between the arms 35 (fixed to the retractor frame 13 by pins 36 extending into specifically located openings) and the arms 37 which flex upon the engagement of pawl teeth 26 with the ratchets of flanges 24 and causing the pawl bar to kick into engagement with a suitable thrust buttress in the frame. The journal sockets 38 of the present invention are seen molded into both saddles 16 and 17 and are best appreciated on the right hand arms 37 of the saddles 16 and 17.

Figure 5:
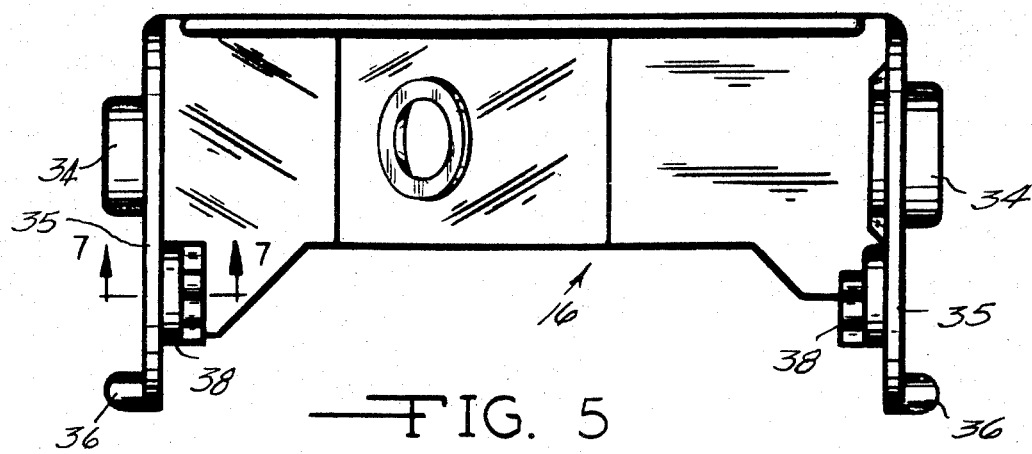
FIG. 5 is a vertical top plan view assuming that the retractor shaft axis is horizontal, while in fact, the only true horizontal is in the plane of the sensor support when the sensor is vertical.
Figure 6:
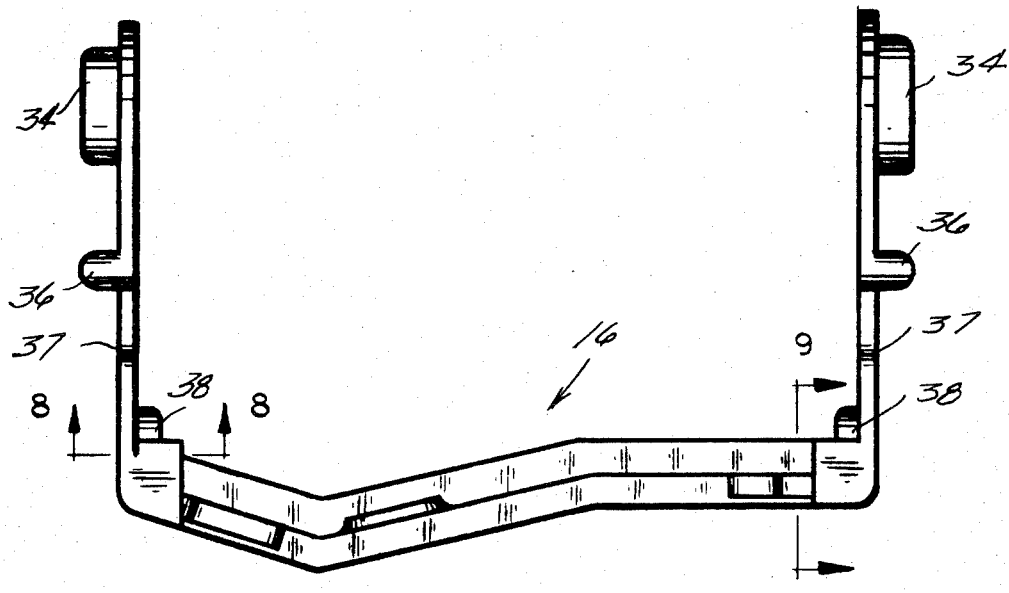
FIG. 6 is a front elevation view of the saddle and indicating the journalling of the present invention.
Figures 7, 8, 9:
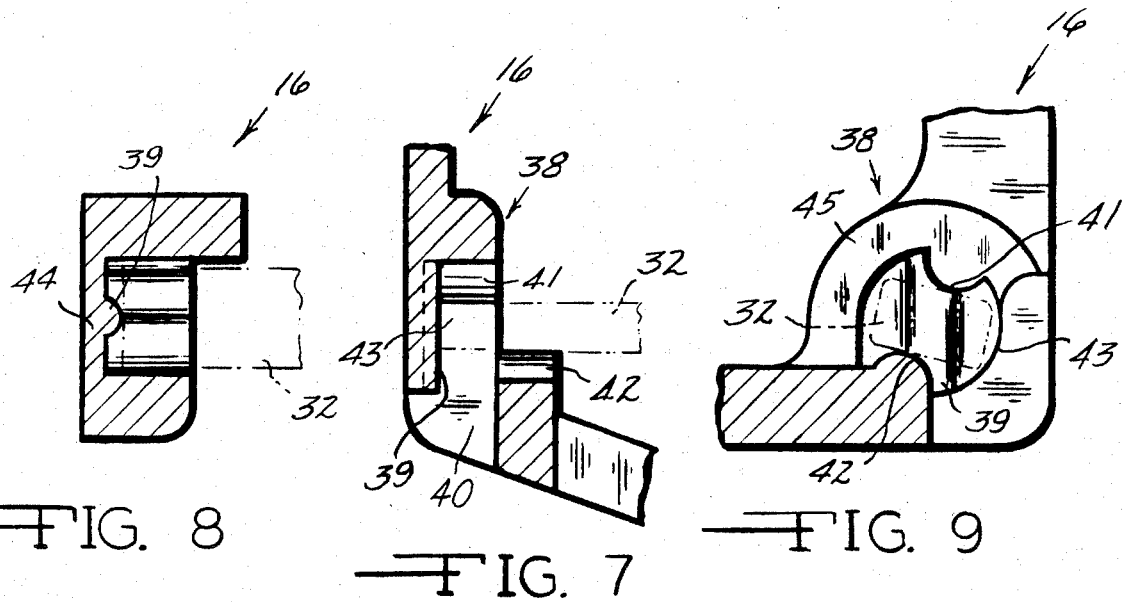
FIG. 7 is a cross section fragmental elevation view taken on the line 7—7 of FIG. 5 and indicating the form of the journal acting against the axis of the pivot.
FIG. 8 is a bottom plan cross section view taken on the line 8—8 of FIG. 7 and indicating the position of the sector bar transverse of the stub shaft end of the pawl bar.
FIG. 9 is a cross section elevation view taken on the line 9—9 of FIG. 6 and indicating the extension of axial thrust receiving journalling applied also to the radial journalling of the rectilinear or rectangular stub shaft in accord with the FIG. 7 showing.

FIGS. 5 and 6 show the saddle 16, deviating only from saddle 17 in angle of mounting from horizontal and with the pawl bar 22 removed therefrom. The sockets 38 are clearly located. The FIGS. 7, 8 and 9 are selected cross sections through sockets 38 and indicating in detail the preferred construction as molded into the saddles 16 and 17. Not shown as preferred but embodied in the present invention are inserts pressed or molded into the socket positions and otherwise providing raised arcuate contacts transverse to the shaft surfaces served. In the FIG. 7 in phantom line, the rectangular stub shaft 32 is shown. The raised arcuate end contact 39 contacts the end of the shaft 32 transverse of the cross section dimension. The opening 40 allows a mold relief and the upper and lower radial raised arcuate surfaces 41 and 42 cradle the relative horizontal surfaces of the stub shaft in a line contact loosely centered by the general cylindrical shoulders 43. The end barriers 44 of the sockets 38 are the wall from which the thrust journalling projects. FIG. 8 provides a projection through the socket 38 better showing the welt-like arcuate end contact 39 which bears against the shaft 32 when the shaft 32 is loaded axially.

The FIG. 9 best shows the molded cylindrical boss 45 of the bearing socket 38 and illustrates the askew relation of the raised radial bearing elements 41 and 42 is askew relation to the raised arcuate thrust journal surface or welt 39. The disposition of the stub shaft 32 is seen in phantom line.

The qualities of the plastic material in the sockets 38 and integral saddle structure should be tough, dimensionally stable but deformable under moderate stressing without breaking and having good memory characteristics.

In operation, the retractor structures employing the minimum friction structures show results that permit extension of angular retractor mounting to 80° from horizontal. Variations in the form of the raised surfaces in thrust and radial contact with the rectangular shafts have been successfully tested besides the preferred form as shown, such as knife edges or chisel edges and sharply arched surfaces.

Having thus described my invention and a preferred embodiment thereof, those skilled in the art will perceive improvements, modifications and changes therein and such improvements, modifications and changes therein are intended to be included herein limited only by the spirit of my hereinafter appended claims.

I claim:

1. A seat belt retractor including a frame, a drum supported by said frame for rotation about an axis and on which seat belt webbing is wound, ratchet means secured to and rotatable with said drum, pawl means pivotable into engagement with said ratchet means to lock said ratchet means and thereby lock said drum against rotation in the direction of withdrawal of said seat belt webbing, said pawl means including a pair of projections, pawl support means for supporting said pair of projections and thereby said pawl means for pivotal movement about a pivot axis parallel to the axis of said drum, said pawl support means comprising means defining a pair of sockets for receiving said pair of projections for pivotal movement therein, each of said sockets including an end wall defining an end barrier, said end barrier having an axial arcuate projection thereon for engaging an end face of the projection received therein, and each of said sockets being also defined by opposite arcuate projections on said pawl support means which extend radially of said pivot axis for engaging said projections.

2. A seat belt retractor as set forth in claim 1 wherein said radial arcuate projections are located different distances from said axial arcuate projection on said end barrier.

3. A seat belt retractor as set forth in claim 1 wherein each of said pair of projections has a rectangular cross section having opposite parallel major surfaces and an end surface extending transverse to said opposite parallel major surfaces, said axial arcuate projection engaging said end surface, and said opposite radial projections engaging said opposite parallel major surfaces.

4. A seat belt retractor as set forth in claim 1 wherein the axis about which said drum rotates and the pivot axis of said pawl extend at an angle of 30° or greater to the horizontal.

5. A seat belt retractor as set forth in claim 4 further including a pendulum weight supported by said pawl support means and movable in response to deceleration of the vehicle to pivot said pawl means into engagement with said ratchet means.

6. A seat belt retractor for a vehicle including a frame, a drum rotatably supported by said frame and on which seat belt webbing is wound, said drum having an axis extending at an angle of 30° or greater to the horizontal, ratchet means secured to and rotatable with said drum, pawl means pivotable into engagement with said ratchet means to lock said ratchet means and thereby said drum against rotation in the direction of withdrawal of said seat belt webbing, said pawl means including a pair of projections, pawl support means for supporting said pair of projections and thereby said pawl means for pivotal movement about a pivot axis parallel to the axis of said drum, said pawl support means comprising respective socket means for receiving said projections for pivotal movement therein, said respective socket means having respective arcuate raised portions that support said projections for pivotal movement about said pivot axis, said respective socket means having respective end walls defining respective end barriers, and said respective arcuate raised portions comprise respective axial arcuate projections formed on said respective end walls, said respective axial arcuate projections engaging respective end faces of said projections, and a pendulum weight suspended vertically from said pawl support means, movement of said pendulum weight from its vertical position in response to deceleration of the vehicle effecting pivotal movement of said pawl means into engagement with said ratchet means.

7. A seat belt retractor as set forth in claim 6 wherein said socket means further includes respective opposite radial arcuate projections for engaging respective side surfaces on said projections.

8. A seat belt retractor as set forth in claim 7 wherein each of said pair of projections has a rectangular cross section having opposite parallel major surfaces and an end surface extending transverse to said opposite parallel major surfaces, said axial arcuate projection engaging said end surface, and said opposite radial arcuate projections engaging said opposite parallel major surfaces.

9. A seat belt retractor as set forth in claim 8 wherein said pawl support means is an injection molded one-piece structure.

10. A seat belt retractor for a vehicle including a frame, a drum rotatably supported by said frame and on which seat belt webbing is wound, ratchet means secured to and rotatable with said drum, pawl means pivotable into engagement with said ratchet means to lock said ratchet means and thereby said drum against rotation in the direction of withdrawal of said seat belt webbing, said pawl means including a pair of projections, pawl support means for supporting said pair of projections and thereby said pawl means for pivotal movement about a pivot axis parallel to the axis of said drum, said pawl support means comprising respective socket means for receiving said projections for pivotal movement therein, said respective socket means having portions that support said projections for pivotal movement about said pivot axis, a pendulum weight suspended vertically from said pawl support means, movement of said pendulum weight from its vertical position in response to deceleration of the vehicle providing for the pivotal movement of said pawl means into engagement with said ratchet means, said drum having an axis extending at an angle of 30° or greater to the horizontal, said portions of said socket means having line contact with said projections in all positions of said projections in said socket means thereby minimizing friction therebetween, and at least one of said portions engaging an end face of one of said projections.

* * * * *

UNITED STATES PATENT AND TRADEMARK OFFICE
CERTIFICATE OF CORRECTION

PATENT NO. : 4,529,145

DATED : July 16, 1985

INVENTOR(S) : Befort, Horst U.

It is certified that error appears in the above-identified patent and that said Letters Patent is hereby corrected as shown below:

Item [73] on title page should read:

"TRW Automotive Products Inc., Euclid, Ohio"

Signed and Sealed this

Twenty-fourth Day of February, 1987

Attest:

DONALD J. QUIGG

Attesting Officer     Commissioner of Patents and Trademarks